Patented Aug. 12, 1941

2,252,536

UNITED STATES PATENT OFFICE 2,252,536

PURIFYING PYROLYSATES OF HALO-HYDROCARBONS

Ralph M. Wiley, Midland, Mich., assignor to The Dow Chemical Company, Midland, Mich., a corporation of Michigan No Drawing. Application March 27, 1939, Serial No. 264,485

4 Claims. (Cl. 260—654)

This invention relates to a method of purifying the products of the pyrolysis of halogenated aliphatic hydrocarbons.

When halogenated hydrocarbons of the aliphatic series are cracked or pyrolyzed, or when aliphatic hydrocarbons are simultaneously or concurrently halogenated and cracked, the gaseous pyrolysate contains, among other products, hydrogen halide and in many cases a water-soluble acetylene compound, such as acetylene and/or monohalo-acetylene. The presence of such latter materials gives rise to considerable difficulty, both in separating the products and in recovering the hydrogen halide in useful form.

The commonest monohalo-acetylene, monochloro-acetylene, is highly auto-explosive and its presence constitutes a hazard in the usual methods of working up the pyrolysate. Monochloro-acetylene is readily soluble in liquid hydrocarbons and chlorinated hydrocarbons which are produced by the cracking of chlorinated aliphatics. When attempts are made to separate the liquid condensate by distillation, the dissolved gaseous monochloro-acetylene, on contact with air or light, or when heated, decomposes spontaneously and violently.

It has been proposed to condense gaseous pyrolysates of halogenated hydrocarbons by treatment with a large enough volume of water to dissolve both the hydrogen halide and the somewhat water-soluble monohalo-acetylene, but this practice involves the loss of hydrogen halide, because the aqueous solution of the acid obtained is too dilute to be used for commercial purposes.

It is an object of the invention to provide a method whereby the pyrolysates of chlorinated aliphatic hydrocarbons may be safely freed from monochloro-acetylene. It is another object to provide a method for the direct preparation of a concentrated hydrochloric acid solution from gaseous pyrolysates of the chlorinated hydrocarbons.

It has now been found that the foregoing and related objects may be attained in a process for the pyrolysis or cracking of chlorinated hydrocarbons, wherein hydrogen chloride and monochloro-aceylene are among the gaseous products, by scrubbing the hot cracked gases, suitably after partial condensation of high boiling products, first with a relatively small amount of cold water to absorb the hydrogen chloride, and then in a separate step intimately mixing the remaining gases and vapors, which contain the water-soluble acetylene derivative, with water or a dilute aqueous alkali solution in large excess, at a temperature preferably below 30° C., whereby the monochloro-acetylene is dissolved away from the water-insoluble liquid products of the cracking process.

The treatment of the gaseous pyrolysate is thus effected in two principal stages. In the first step the gaseous pyrolysis products are scrubbed with the least possible amount of water to absorb hydrogen chloride and form a concentrated solution without dissolving other vaporous or gaseous pyrolysis products. The absorption of hydrogen chloride in water is an exothermic reaction, and the temperature of the absorption zone is preferably held below 50° C. by suitable cooling. The acid solution, however, should preferably attain a temperature of at least 30° C. to prevent solution of monochloro-acetylene in the acid solution. Some of the pyrolysis products are condensed by contact with cold water in the acid scrubbing zone. The condensed oily liquids are separated from the acid as by decantation. A 10 to 30 per cent solution of hydrochloric acid may be formed in a single pass of the water through the scrubber and, if the acid is recirculated, stronger solutions may be produced, substantially free from monochloro-acetylene. After scrubbing in this way, the gases are substantially free from hydrogen chloride but still contain the water-soluble acetylene compounds. The second step in the treatment consists in bringing the remaining pyrolysates into intimate contact with a large volume of water or dilute aqueous alkali, preferably at a temperature below 30° C. This treatment results in the absorption of remaining traces of hydrogen chloride and in the solution of the water-soluble acetylene compounds from the pyrolysis product. The amount of water employed in the second step should be several times the weight of the total products of pyrolysis, so as to insure that the solution of monochloro-acetylene is so dilute that it will not exhibit any of its explosive tendencies. The actual amount of monochloro-acetylene in a pyrolysis product, under ordinary circumstances, seldom exceeds 1 to 2 per cent. If in a particular instance a larger quantity of monochloro-acetylene is present, the amount of water or alkali employed in the second scrubbing operation is correspondingly increased to provide final solutions of the desired safe dilution of, for example, 0.5 per cent or less.

The following examples will illustrate the practice of the invention:

*Example 1*

A mixture of chlorinated hydrocarbons containing various polychloro-derivatives of ethane, propane and butane was vaporized and pyrolyzed by passing through a heated metal coil over a surface catalyst at temperatures above a dull red heat, and the vapors cooled to condense high boiling materials. The products of reaction included hydrogen chloride, vinyl chloride, vinylidene chloride, and various chloropropenes, chlorobutenes, chlorobutadienes, and a small but noticeable percentage of monochloro-acetylene. A sample of the liquid pyrolysates was taken for distillation in a glass fractionating column and had been heated to no more than 40° C. when a series of explosions which appeared to originate in the receiver traveled backward through the condenser, down the distilling column and into the still, damaging the apparatus. The pyrolysis of the mixture of chlorinated hydrocarbons was continued as before, the following addition being made to the method employed. As the cracked products left the reaction zone they were passed counter-current to a relatively small amount of cold water in an externally cooled ring-packed scrubbing tower. The aqueous hydrochloric acid and liquid pyrolysates attained a temperature of about 35° C., and were separated in a continuous decanter, a substantially pure hydrochloric acid solution being obtained. The gases and vapors remaining after the first wash with cold water were conducted to a second scrubber wherein they were contacted with a large excess of cold water to which had been added a trace of alkali. Approximately 100 gallons of water were employed in washing and scrubbing the pyrolysates from cracking 50 pounds of the polychlorinated hydrocarbons. The liquid pyrolysates obtained by condensation in the two scrubbers could be distilled with no evidence of decomposition or explosion, and the aqueous hydrochloric acid solution prepared in the first washing step showed no traces of acetylenic products when subjected to the usual tests for such compounds. The dilute aqueous alkaline solution from the second washing step showed by chemical test the presence of monochloroacetylene, but showed no tendency to liberate the monochloroacetylene to form explosive mixtures in air. In subsequent operations the corresponding solution was safely run into the sewer.

*Example 2*

The method, as illustrated in the foregoing example, has been carried out advantageously in the purification of vinylidene chloride prepared by cracking trichloroethane. The product of pyrolysis contains varying amounts of monochloroacetylene, which, if left in the vinylidene chloride, makes the latter dangerous to handle and noticeably affects the polymerization rate thereof. When the two-step washing treatment illustrated in the foregoing example is applied to the mixture, the vinylidene chloride is purified so that it may be handled without hazard, the hydrogen chloride produced in the cracking step is dissolved to form a substantially pure concentrated aqueous solution, and the monochloro-acetylene is removed in the form of a harmlessly dilute aqueous solution.

The invention has been illustrated and explained with reference to the purification of pyrolysates containing hydrogen chloride and monochloro-acetylene. It is also effective for removing acetylene, which is formed when chlorinated hydrocarbons such as dichloroethane are cracked to produce vinyl chloride. Vinyl chloride is employed for the preparation of useful polymeric products, but it has been found that the presence of acetylene noticeably diminishes the polymerization rate. Hydrogen chloride and acetylene may be removed in similar manner from pyrolysates containing them, by first scrubbing the said pyrolysates with a relatively small amount of cold water to remove most of the hydrogen chloride, and then scrubbing the remaining product with a large volume of water to dissolve the acetylene and final traces of hydrogen chloride. An illustration of this application of the invention is furnished by the following example.

*Example 3*

A mixture of chlorinated hydrocarbons, rich in ethylene chloride, was subjected to pyrolysis under conditions such that the major product was vinyl chloride. The cracked products, consisting of vinyl chloride, hydrogen chloride, acetylene, and small amounts of various higher boiling materials, were passed counter-current to a small amount of cold water, in a ring-packed tower, as in Example 1. The so-formed hydrochloric acid solution was substantially free from acetylene and vinyl chloride. The remaining mixture, consisting in the main of vinyl chloride and acetylene, was subjected to sufficient pressure to maintain the vinyl chloride in the liquid state at room temperature, and was washed with a large excess of cold water, whereby the acetylene was extracted from the vinyl chloride. Prior to the second washing operation wherein the acetylene was removed, the vinyl chloride polymerized with difficulty, but after the acetylene had been extracted it polymerized readily.

The herein-described method has considerable advantage over the heretofore employed process of precipitating acetylenic compounds as the heavy metal salts thereof from mixtures containing the same. In one typical experimental operation wherein chloroacetylene was removed from the gas mixture by precipitation as its mercury salt and in another where acetylene was precipitated as the silver salt, the cost of separating the acetylenic product from the desired cracked products was greater than the commercial value of the said desired products. The present method not only makes unnecessary such costly practice but it provides a much simpler means of effecting separation. Furthermore, a substantially pure concentrated hydrochloric acid solution can also be obtained from a gas mixture comprising hydrogen chloride and acetylene and/or monochloro-acetylene.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:

1. In a process for the pyrolysis of chlorinated hydrocarbons, wherein hydrogen chloride and a water-soluble compound selected from the group consisting of acetylene and monochloroacetylene are among the gaseous products, the steps which consist in passing the mixed products into intimate contact with a relatively small amount of cold water whereby to absorb selectively most of the hydrogen chloride to form a concentrated HCl solution, and then in a separate step intimately mixing the remaining product, which contains the said water-soluble acetylenic compound and remaining traces of hydrogen chloride, with a substantial excess of a liquid selected from the group consisting of water and dilute aqueous alkali solution, whereby the said water-soluble compound and remaining hydrogen chloride are dissolved, and the desired pyrolysates are purified with respect to hydrogen halide and said water-soluble compound.

2. In a process for the pyrolysis of chlorinated hydrocarbons, wherein hydrogen chloride and monochloro-acetylene are among the gaseous products, the steps which consist in passing the mixed products into intimate contact with a relatively small amount of cold water, whereby to absorb selectively most of the hydrogen chloride to form a concentrated HCl solution, and then in a separate step intimately mixing the remaining product, which contains monochloro-acetylene and remaining traces of hydrogen chloride, with a substantial excess of a liquid selected from the group consisting of water and dilute aqueous alkali solution, whereby the monochloro-acetylene and remaining hydrogen chloride are dissolved, and the liquid pyrolysates are purified with respect to hydrogen chloride and monochloro-acetylene.

3. In a process for the pyrolysis of chlorinated hydrocarbons, wherein hydrogen chloride and acetylene are among the gaseous products, the steps which consist in passing the mixed products into intimate contact with a relatively small amount of cold water, whereby to absorb selectively most of the hydrogen chloride to form a concentrated HCl solution, and then in a separate step intimately mixing the remaining product, which contains acetylene and remaining traces of hydrogen chloride, with a substantial excess of a liquid selected from the group consisting of water and dilute aqueous alkali solution, whereby the acetylene and remaining hydrogen chloride are dissolved, and the desired pyrolysates are purified with respect to hydrogen chloride and acetylene.

4. In a process for the pyrolysis of chlorinated hydrocarbons, wherein hydrogen chloride and a water-soluble compound selected from the group consisting of acetylene and monochloroacetylene are among the gaseous products, the steps which consist in passing the mixed products into intimate contact with a relatively small amount of water in a scrubbing zone which is at a temperature between 30° and 50° C., whereby to absorb selectively most of the hydrogen chloride to form a concentrated HCl solution, and then in a separate step mixing the remaining product, which contains the said water-soluble acetylenic compound and remaining traces of hydrogen chloride, with a substantial excess of a liquid selected from the group consisting of water and dilute aqueous alkali solution, the said liquid being at a temperature below 30° C., whereby the said water-soluble compound and remaining hydrogen chloride are dissolved, and the desired pyrolysates are purified with respect to hydrogen halide and said water-soluble compound.

RALPH M. WILEY.